United States Patent
Codilian et al.

(10) Patent No.: US 7,120,806 B1
(45) Date of Patent: Oct. 10, 2006

(54) METHOD FOR SETTING A POWER OPERATING MODE TRANSITION INTERVAL OF A DISK DRIVE IN A MOBILE DEVICE BASED ON APPLICATION CATEGORY

(75) Inventors: Raffi Codilian, Irvine, CA (US); Anil Sareen, Mission Viejo, CA (US); Thomas D. Hanan, Mission Viejo, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 635 days.

(21) Appl. No.: 10/105,493

(22) Filed: Oct. 31, 2001

(51) Int. Cl.
*G06F 1/32* (2006.01)

(52) U.S. Cl. ............ 713/320; 713/300; 713/322; 713/323

(58) Field of Classification Search ........ 713/300–340; 369/30.15, 47.1
See application file for complete search history.

(56) References Cited

U.S. PATENT DOCUMENTS

| | | | |
|---|---|---|---|
| 5,452,277 A | 9/1995 | Bajorek et al. | |
| 5,481,733 A | 1/1996 | Douglis et al. | |
| 5,493,670 A | 2/1996 | Douglis et al. | |
| 5,504,907 A | 4/1996 | Stewart et al. | |
| 5,517,649 A * | 5/1996 | McLean | 713/323 |
| 5,544,138 A | 8/1996 | Bajorek et al. | |
| 5,682,273 A * | 10/1997 | Hetzler | 360/75 |
| 5,774,292 A | 6/1998 | Georgiou et al. | |
| 5,787,292 A * | 7/1998 | Ottesen et al. | 713/300 |
| 5,954,820 A | 9/1999 | Hetzler | |
| 6,097,679 A * | 8/2000 | Ohtaki | 369/47.11 |
| 6,128,717 A * | 10/2000 | Harrison et al. | 711/202 |
| 6,400,892 B1 * | 6/2002 | Smith | 386/125 |
| 6,516,421 B1 | 2/2003 | Peters | |
| 6,553,501 B1 | 4/2003 | Yokoe | |
| 6,608,729 B1 | 8/2003 | Willems et al. | |
| 6,721,906 B1 * | 4/2004 | Hirashita et al. | 714/54 |
| 6,892,313 B1 | 5/2005 | Codilian et al. | |
| 2005/0044436 A1 | 2/2005 | Holle | |
| 2005/0125702 A1 | 6/2005 | Huang et al. | |

FOREIGN PATENT DOCUMENTS

WO   WO 01/15161 A1   3/2001

* cited by examiner

*Primary Examiner*—Lynne H. Browne
*Assistant Examiner*—Paul Yanchus, III
(74) *Attorney, Agent, or Firm*—Jason T. Evans, Esq.; Robroy R. Fawcett, Esq.

(57) ABSTRACT

The invention may be embodied in a method for operating a disk drive in a mobile device to optimize power usage based on an application category. The mobile device may be a hand held computing device such as a personal digital assistant (PDA) or a mobile terminal such as a cellular telephone. A technique of the invention may spin down the disk drive after an adjustable delay time interval that is set based on an application category associated with a most recent data transfer command.

32 Claims, 6 Drawing Sheets

METHOD FOR SETTING A POWER OPERATING MODE TRANSITION INTERVAL OF A DISK DRIVE IN A MOBILE DEVICE BASED ON APPLICATION CATEGORY

BACKGROUND OF THE INVENTION

1. Field of the Invention

The present invention relates to digital data storage, and more particularly, to operation of a hard disk drive in a mobile device to optimize power usage.

2. Description of the Prior Art

A hand-held mobile device has limited battery capacity and the power consumption of each component within the device may be of critical concern. A hard disk drive provides digital data storage on a magnetic media of a rotating disk. A spindle motor rotates the disk at a predetermined rate during access to the disk. The power consumption of the spindle motor may be reduced by "spinning down" the disk between disk accesses thus allowing removal of a power consuming control current to the spindle motor. However, spinning down the disk affects the response time of the disk drive to disk commands and may involve a power consumption penalty associated with "spinning up" the disk drive.

Accordingly, there exists a need for a technique for operating a disk drive in a mobile device to optimize power usage. The present invention satisfies these needs.

SUMMARY OF THE INVENTION

The present invention may be embodied in a mobile device having a disk drive, and a method for operating the disk drive in the mobile device to optimize power usage. The mobile device has a file system for generating data transfer commands based on requests by applications. The disk drive receives and executes data transfer commands. Immediately after responding to a data transfer command from the mobile device, the disk drive is in a first operating mode that consumes a relatively high level of power and may transition to a second operating mode that consumes a relatively low level of power. In the method, first and second operating mode transition time intervals are set for transitioning the disk drive from the first operating mode to the second operating mode after an end of a response to a disk access command. The first time interval is less than the second time interval and is associated with a first application category, and the second time interval is associated with a second application category. A delay time interval is selected to correspond to one of the transition time intervals based on the application category associated with a most recent data transfer command. The disk drive is transitioned from the first operating mode to the second operating mode based on the selected delay time interval.

In more detailed features of the invention, a disk platter in the disk drive is spinning at an operational rate in the first operating mode, and is not spinning at an operational rate in the second operating mode, i.e., the disk platter is stopped or is spinning at a lower rate that is substantially reduced from the operational rate. A data transfer command may include a code for an application category that is based on the application requesting the data transfer command. The disk drive may include a data structure for the operating mode transition time intervals and the disk drive and may be responsive to a command from the mobile device for writing a value for an operating mode transition time interval to the data structure. The first application category may include a word processing application and the second application category may include a web browser application. The disk drive may update an operating mode transition time interval in the data structure based on a usage pattern of previous data transfer commands.

Further, transitioning from the second operating mode to the first operating mode may consume a transition quantity of power. An exchange time interval is defined as a time period during which power consumed by operating in the first power operating mode is about equal to the transition quantity of power. The first and second operating mode transition time intervals may be less than the exchange time interval.

In other more detailed features of the invention, the mobile device may include a data transfer command queue for receiving data transfer commands and process identifiers from the file system, and may include a driver for receiving the data transfer commands and process identifiers from the data transfer command queue and for associating an application category for a most recent command in the queue based on the process identifier. The step of transitioning the disk drive from the first operating mode to the second operating mode based on the set delay time interval may be performed by issuing a spin-down command to the disk drive.

BRIEF DESCRIPTION OF THE DRAWINGS

The accompanying drawings illustrate embodiments of the present invention and, together with the description, serve to explain the principles of the invention.

DETAILED DESCRIPTION

Figure 1:
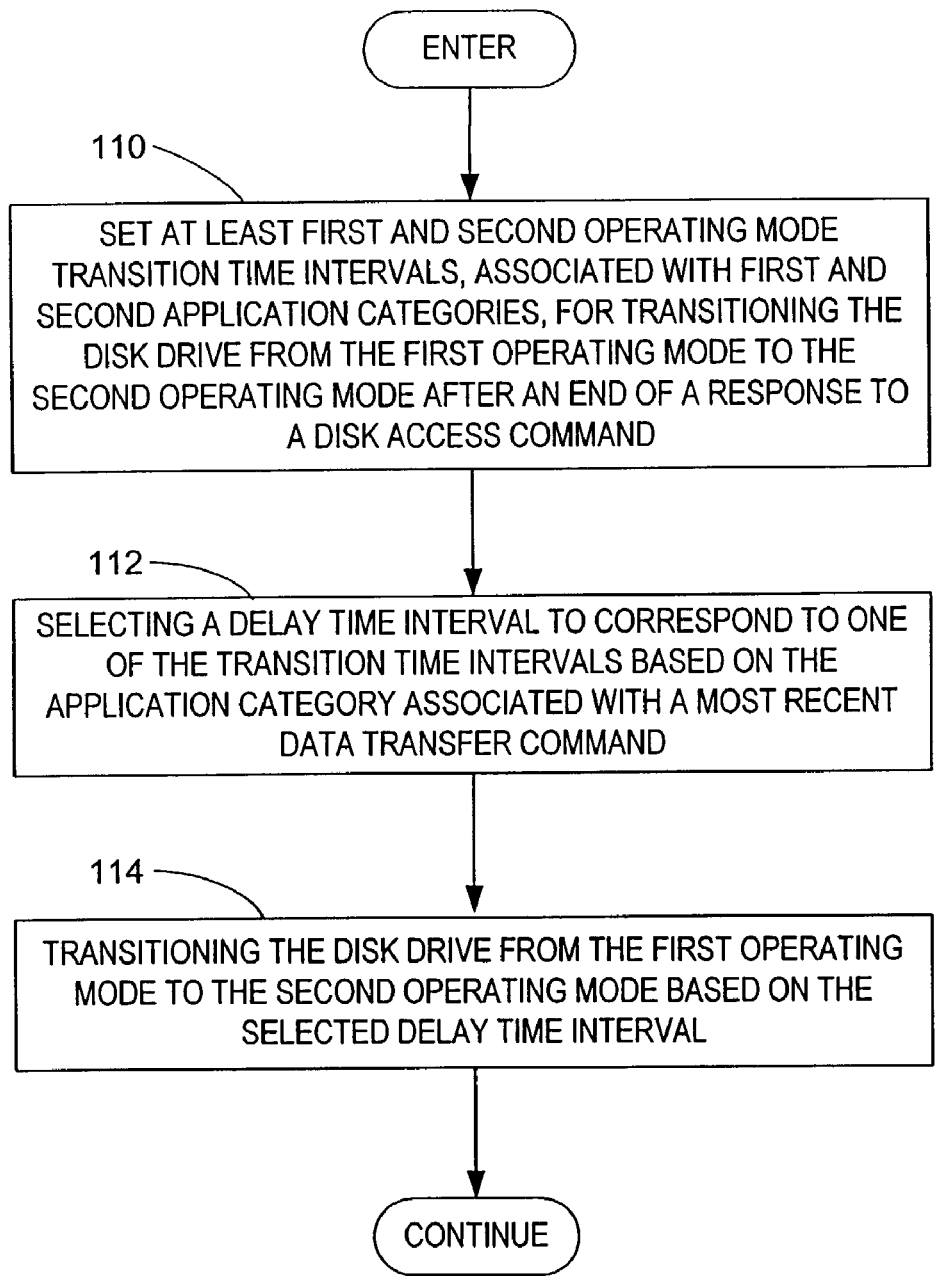
FIG. 1 is a flow diagram of a method for operating a disk drive in a mobile device for optimizing power usage based on an application category, according to the present invention.
Figure 2:
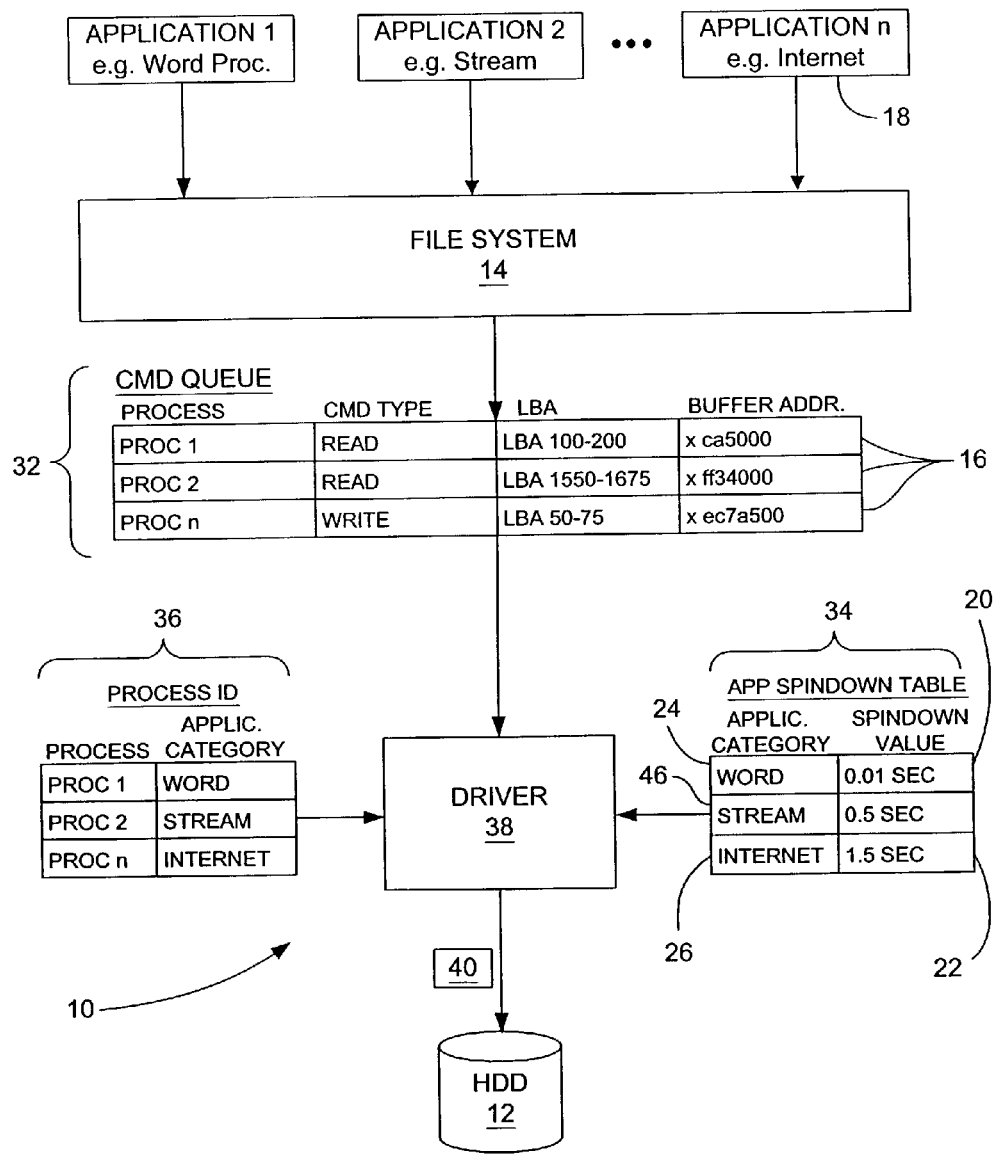
FIG. 2 is a schematic diagram of a first embodiment of a mobile device that operates a disk drive to optimize power usage based on an application category, according to the present invention.

With reference to FIGS. 1 and 2, the present invention may be embodied in a mobile device 10 having a disk drive 12, and a method for operating the disk drive in the mobile device to optimize power usage based on an application category. The mobile device may be a hand-held computing device such as a personal digital assistant (PDA) or a mobile terminal such as a cellular telephone. The mobile device has an operating system providing a file system 14 for generating data transfer commands 16 based on requests by applications 18. The disk drive receives and executes the data transfer commands. Immediately after responding to a data transfer command from the mobile device, the disk drive is in a first operating mode that consumes a relatively high level of power and may transition to a second operating mode that consumes a relatively low level of power. In the method, at least first and second operating mode transition time intervals, 20 and 22, are set for transitioning the disk drive from the first operating mode to the second operating mode after an end of a response to a disk access command (step 110). The first time interval is less than the second time interval and is associated with a first application category 24, and the second time interval is associated with a second application category 26. A delay time interval is selected to correspond to one of the transition time intervals based on the application category associated with a most recent data transfer command (step 112). The disk drive is transitioned from the first operating mode to the second operating mode based on the selected delay time interval (step 114).

In the first operating mode, a disk in the disk drive 12 may be spinning at an operational rate. Continuous operation in the first operating mode consumes substantial battery power from the mobile device 10. Advantageously, during a period of low disk activity, the disk drive may be transitioned to the second operating mode by removing or reducing a motor drive current to a spindle motor in an operation generally referred to as "spinning down" the disk. Thus, the disk may be stopped, or may be spinning at a lower rate that is substantially reduced from the operational rate. Returning the disk drive to an active state involves returning the disk to its standard operational rate in an operation generally referred to as "spinning up" the disk. Spinning up the disk consumes battery power at an increased rate until a steady state rotational rate is obtained. This transitional quantity of power is an inherent power penalty associated with spinning down and then spinning up the disk. Accordingly, unnecessarily spinning down the disk may consume more battery power than maintaining the disk drive in the first operating mode. Efficient battery power management requires a balance between keeping the disk drive in a lower power mode versus transitioning it back to a higher power mode to service a disk access.

An exchange time interval is defined as a time period during which power consumed by operating in the first operating mode is about equal to the transition quantity of power. Advantageously, the first and second operating mode transition time intervals, 20 and 22, may be less than the exchange time interval to enhance to probability of power saving based on spinning down the disk drive 12.

The mobile device 10 may optimize the power usage of the disk drive 12 either by immediately spinning down the disk drive if the last data transfer command 16 is associated with an application 18 typically having relatively long waits between commands, or by waiting a reasonably short time period before spinning down the disk drive if the last data transfer command 16 is associated with an application 18 having relatively short waits between commands. The first application category 24 may be characterized in that the data transfer commands 16 generally may request large blocks of data separated by relatively long time intervals. An example may include a word processing application. The second application category 26 may be characterized in that the data transfer commands generally may request small blocks of data that may be separated by relatively short time intervals. Examples may include a web browser or an Internet download program. Advantageously, the first transition time interval would be immediate, e.g., a spin-down value of about 0.01 seconds, and the second transition time interval would correspond to a reasonably short delay time interval, e.g., a spin-down value of about 1.5 seconds. The short delay time interval anticipates a subsequent data transfer command before spinning down the disk drive The techniques of the invention may be implemented by a host processor in the mobile device 10. The operating system is implemented by the processor and provides an environment that allows an application 18 to access the disk drive 12 using the file system 14. Further, the operating system establishes a data transfer command queue 32, an application spin-down time value table 34, a process identification (ID) table 36, and a hard disk drive (HDD) access driver 38. The data transfer command queue receives the data transfer commands and associated process identifiers, logical block address (LBA) ranges, and buffer addresses from the file system. The driver receives the data transfer commands and process identifiers from the queue and uses the process ID table to associate an application category for a last command in the queue based on the process identifier. The driver issues a spin-down command 40 to the disk drive based on the set delay time interval to transition the disk drive from the first operating mode to the second operating mode. The spin-down command may request that the disk drive spin down immediately, or after the desired delay time interval.

The application spin-down table 34 may have a plurality of spin-down values each associated with an application category. For example, the table includes an additional application category 46 for streaming media applications that is associated with a spin-down value of about 0.5 seconds. Further, although the application spin-down time value table is shown as a list, any effective data structure may be used to implement the spin-down time values including, for example, program code in the form of if-then statements, etc.

Figure 3:
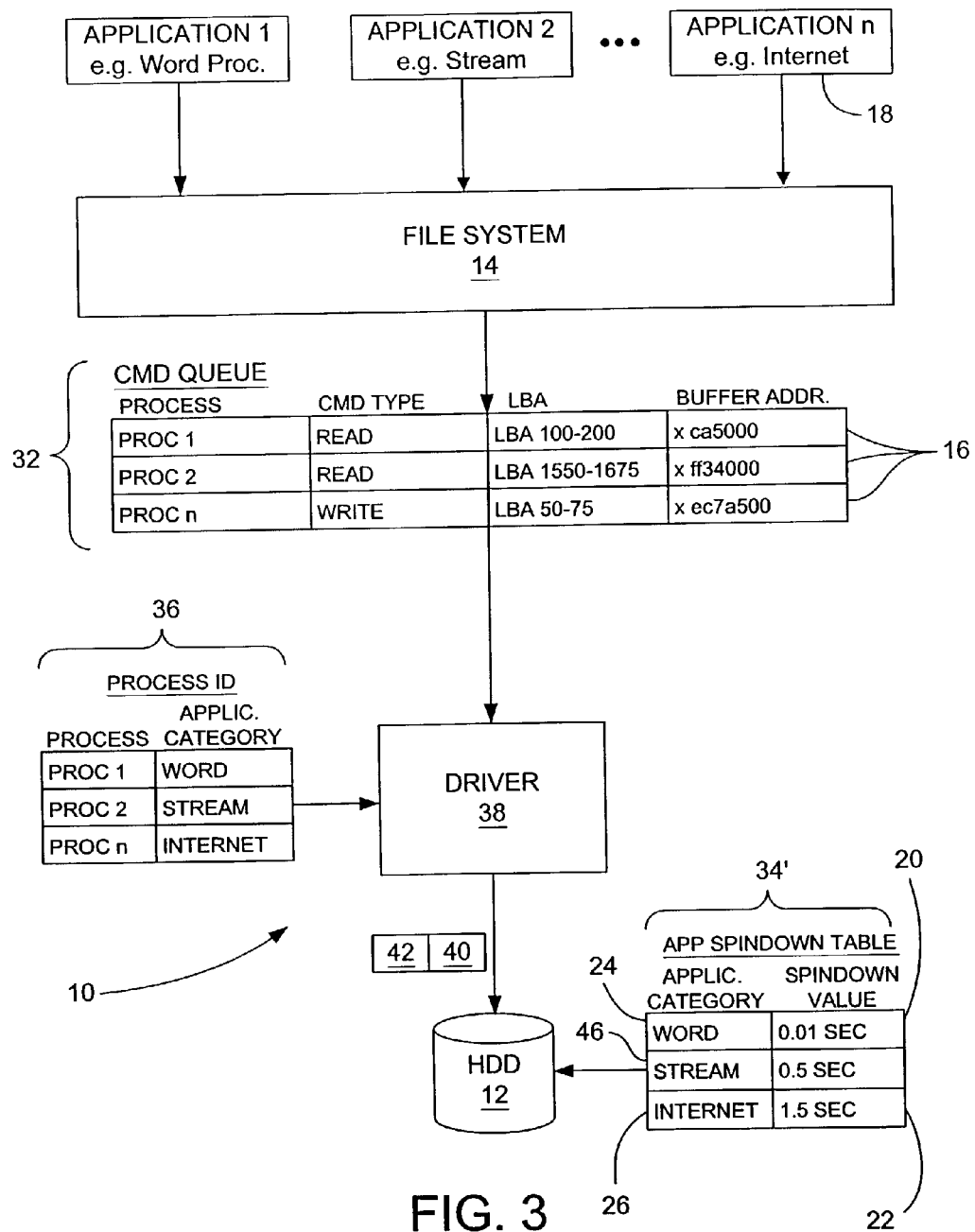
FIG. 3 is a schematic diagram of a second embodiment of a mobile device that operates a disk drive to optimize power usage based on an application category, according to the present invention.

With reference to FIG. 3, the spin-down time value table 34' maybe implemented in the disk drive 12. The driver 38 in the mobile device 10 would issue a data transfer command that includes, or is accompanied by, a code 42 for an application category. The application category code is based on the application 18 requesting the data transfer command. Further, the disk drive may be responsive to a command from the mobile device for writing a value to the table for a transition time interval.

The disk drive 12 may have an internal microprocessor and nonvolatile memory for implementing the techniques of the invention. Program code for implementing the techniques of the invention may be stored in the nonvolatile memory and transferred to volatile random access memory (RAM) for execution by the microprocessor. A suitable microprocessor controlled disk drive is disclosed in U.S. patent application Ser. No. 09/887,583, filed Jun. 21, 2001, titled METHOD FOR PREDICTIVE POWER MANAGEMENT FOR OPERATING A DISK DRIVE IN A MOBILE ENVIRONMENT TO OPTIMIZE POWER USAGE. The entire disclosure of U.S. patent application Ser. No. 09/887,583 is incorporated herein by reference.

The disk drive 12 may have has several power states or modes such as active, idle1, idle2, idle3, and standby. In the active state, all of the disk drive's electronic components are at full power, the disk is spinning at its standard rate, and a seek, read or write operation is in progress. In the idle1 state, the disk is spinning at its standard rate, but select internal components of the disk drive are turned off. In the idle2 state, the spindle motor is turned off, the disk is not spinning, and most of the internal components of the disk drive are turned off or are in a low power mode. The idle3 state is similar to the idle2 state except that the disk is spinning at a fraction of its standard rate and may be an alternative or precursor to the idle2 state. The standby state is similar to the idle2 state except that a clock signal to the microprocessor is inhibited. The first operating mode may include the active state and the second operating mode may include the idle1, idle2, idle3 and standby states.

Figure 4:
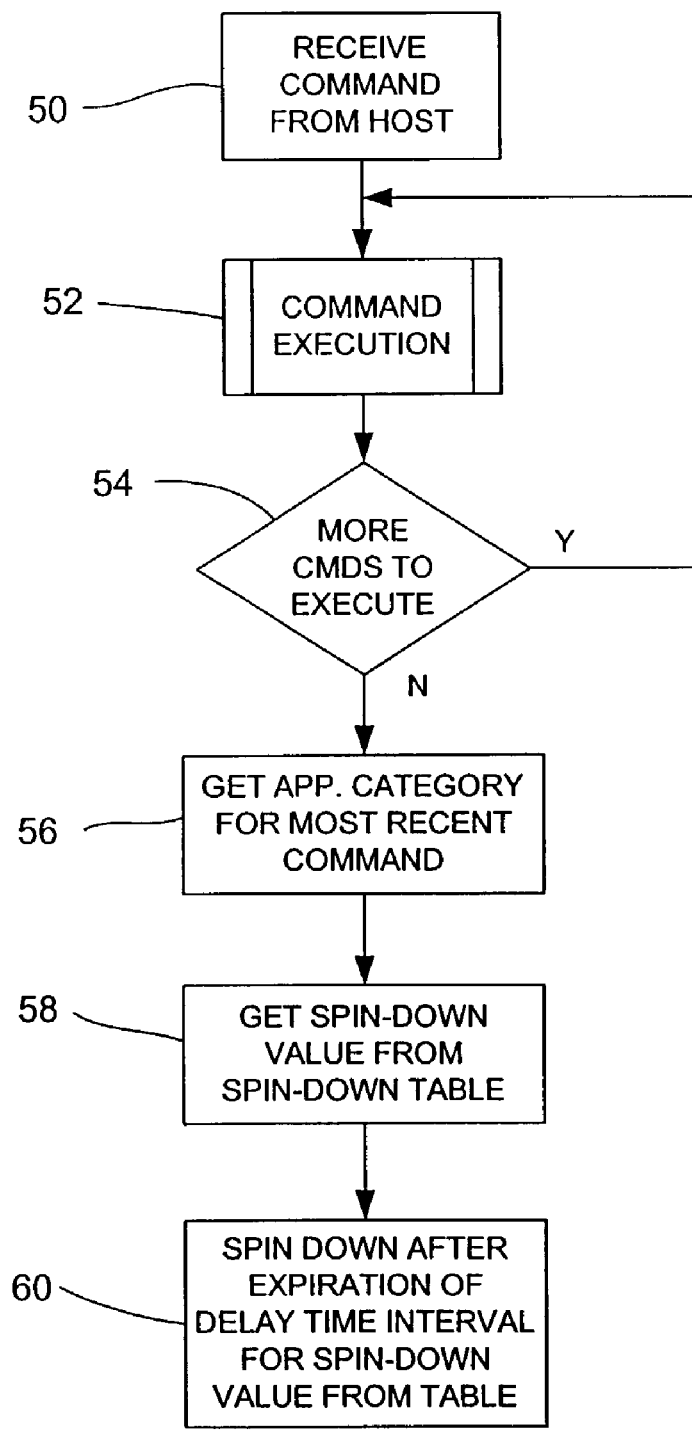
FIG. 4 is a flow diagram of a first embodiment of a power usage technique implemented by the disk drive of FIG. 3.

With reference to FIG. 4, the disk drive 12 may receive commands from a host in the mobile device 10 (step 50) and execute each command (step 52). Commands may be received by the disk drive faster than the disk drive can execute then, and command awaiting execution may be placed in the command queue 32. After execution of each command, the disk drive checks for more commands to execute (step 54). If all commands have been executed, the disk drive obtains the application category associated with the most recently issued data transfer command (step 56). The disk drive then accesses the application spin-down table 34' to select the delay time interval for the application spin-down value associated with the application category of the most recent data transfer command (step 58). The disk drive spins down after expiration of the delay time interval for the spin-down value obtained from the table (step 60).

Figure 5:
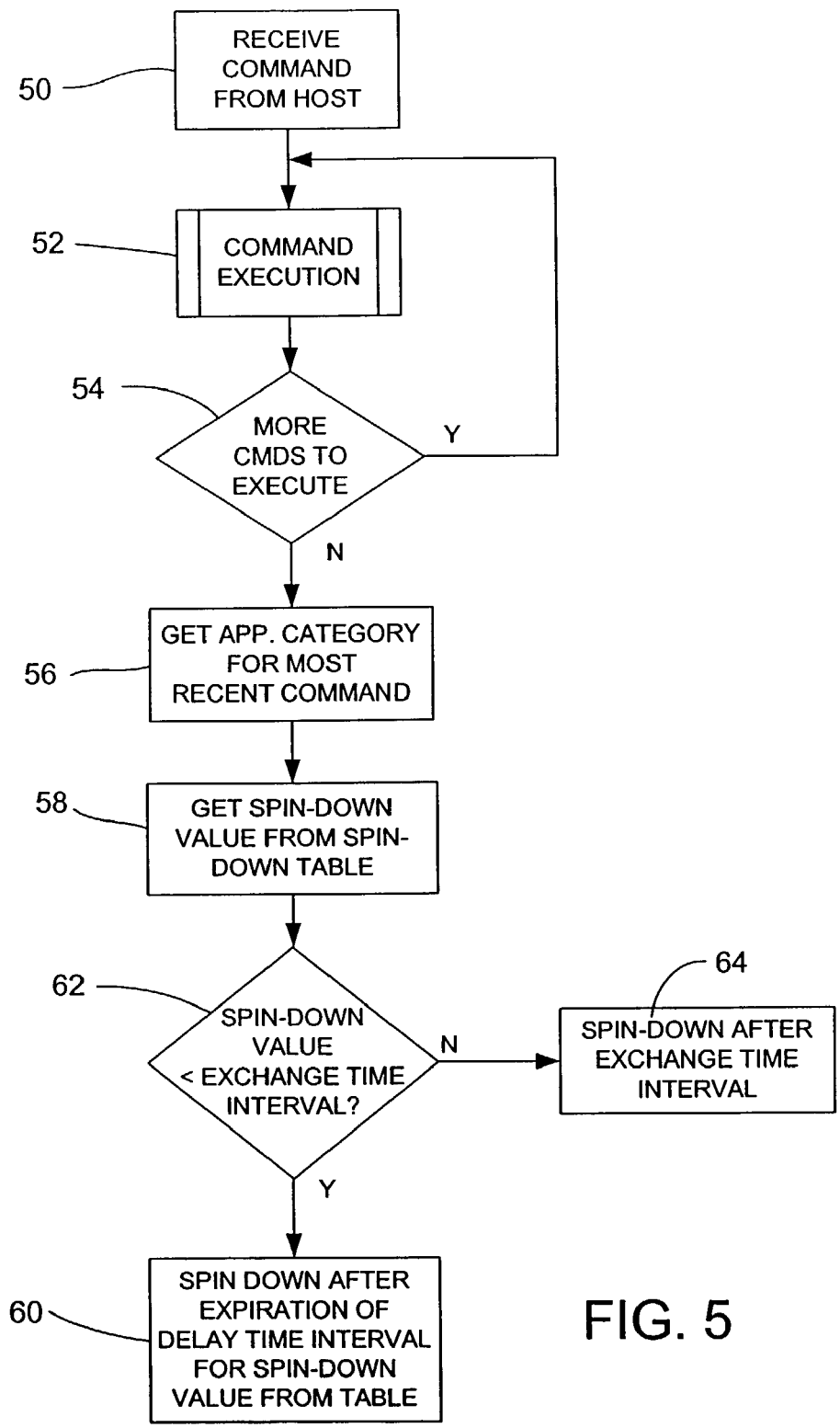
FIG. 5 is a flow diagram of a second embodiment of a power usage technique implemented by the disk drive of FIG. 3.

With reference to FIG. 5, the delay time interval for the spin-down value from the table is compared with the exchange rate (step 62). If the spin-down time obtained from the table 34' is less than the exchange time interval, then the disk drive 12 spins down after expiration of the delay time interval for the spin-down value obtained from the table (step 60). Otherwise, the disk drive will spin down after the exchange time interval expires (step 64).

Figure 6:
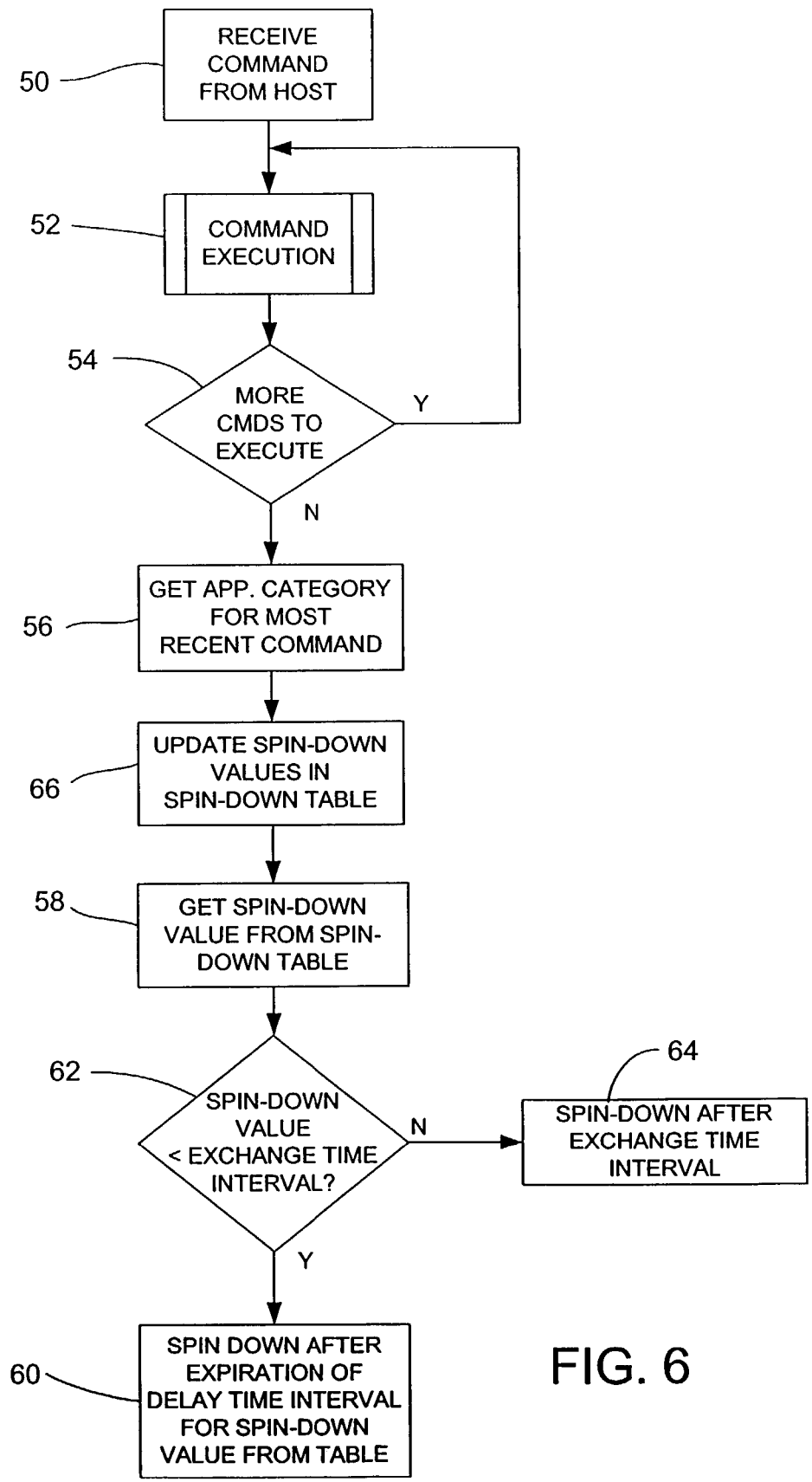
FIG. 6 is a flow diagram of a third embodiment of a power usage technique implemented by the disk drive of FIG. 3.

With reference to FIG. 6, the disk drive 12 may predictively update the spin-down values for the transition time intervals, 20 and 22, in the application spin-down table 34' (step 66). The prediction may be accomplished for each application category based on a usage pattern of previous data transfer commands according to predictive techniques disclosed in U.S. patent application Ser. No. 09/887,583.

We claim:

1. A disk drive for operating in a mobile device having a file system, comprising:
    means for receiving data transfer commands from the mobile device, each data transfer command being generated based on a request by an application and being accompanied by a code for an application category that is based on the requesting application;
    means for setting at least first and second operating mode transition time intervals for transitioning the disk drive after an end of a response to a data transfer command from a first operating mode that consumes a relatively high level of power to a second operating mode that consumes a relatively low level of power, the first time interval being less than the second time interval and being associated with a first application category and the second time interval being associated with a second application category;
    means for selecting a delay time interval to correspond to one of the transition time intervals based on the application category associated with a most recent data transfer command; and
    means for transitioning the disk drive from the first operating mode to the second operating mode based on the selected delay time interval.

2. A disk drive as defined in claim 1, wherein, in the first operating mode, a disk platter in the disk drive is spinning at an operational rate and, in the second operating mode, the disk platter in the disk drive is not spinning at an operational rate.

3. A disk drive as defined in claim 2, wherein, in the second operating mode, the disk platter is stopped.

4. A disk drive as defined in claim 2, wherein, in the second operating mode, the disk platter is spinning at a lower rate that is substantially reduced from the operational rate.

5. A disk drive as defined in claim 1, wherein the means for setting at least first and second operating mode transition time intervals includes a data structure for the operating mode transition time intervals and is responsive to a command from the mobile device for writing a value for an operating mode transition time interval to the data structure.

6. A disk drive as defined in claim 5, further comprising means for updating an operating mode transition time interval in the data structure based on a usage pattern of previous data transfer commands.

7. A disk drive as defined in claim 1, wherein:
    transitioning from the second operating mode to the first operating mode consumes a transition quantity of power;
    an exchange time interval is a time period during which power consumed by operating in the first power operating mode is about equal to the transition quantity of power; and
    the first and second operating mode transition time intervals are less than the exchange time interval.

8. A disk drive as defined in claim 1, wherein the first application category includes a word processing application and the second application category includes an electronic mail reader application.

9. A disk drive for operating in a mobile device having a file system, comprising:
    means for receiving data transfer commands from the mobile device, each data transfer command being generated based on a request by an application;
    means for setting first, second, and third operating mode transition time intervals for transitioning the disk drive after an end of a response to a data transfer command from a first operating mode that consumes a relatively high level of power to a second operating mode that consumes a relatively low level of power, the first time interval being less than the second time interval, and the second time interval being less than the third time interval, and the first time interval being associated with the first application category, the second time interval being associated with the second application category, and the third time interval being associated with a third application category;
    means for selecting a delay time interval to correspond to one of the transition time intervals based on the application category associated with a most recent data transfer command; and
    means for transitioning the disk drive from the first operating mode to the second operating mode based on the selected delay time interval.

10. A disk drive as defined in claim 1, further comprising means for predictively updating the transition time intervals.

11. A disk drive as defined in claim 10, wherein the predictively updating of the transition time intervals is based on a usage pattern of previous data transfer commands received by the disk drive.

12. A method for operating a disk drive in a mobile device having a file system and a disk drive driver, the disk drive for receiving data transfer commands and accompanying application category codes from the disk drive driver and executing the data transfer commands, the file system for generating each data transfer command based on a request by an application, and the disk drive driver for issuing each data transfer command and accompanying application category code to the disk drive, the method comprising the steps of:

setting at least first and second operating mode transition time intervals for transitioning the disk drive from a first operating mode to a second operating mode after an end of a response to a data transfer command, the first time interval being less than the second time interval and being associated with a first application category, and the second time interval being associated with a second application category;

the disk drive selecting a delay time interval to correspond to one of the transition time intervals based on the application category code accompanying a most recently executed data transfer command; and the disk drive transitioning from the first operating mode to the second operating mode based on the selected delay time interval;

wherein the disk drive consumes a higher level of power in the first operating mode than in the second operating mode.

13. A method for operating a disk drive as defined in claim 12, wherein the disk drive predictively updates the transition time intervals.

14. A method for operating a disk drive as defined in claim 13, wherein the predictive update of the transition time intervals is based on a usage pattern of previous data transfer commands received by the disk drive.

15. A method for operating a disk drive as defined in claim 12, wherein setting at least the first and second operating mode transition time intervals comprises setting first, second, and third operating mode transition time intervals for transitioning the disk drive from the first operating mode to the second operating mode after an end of a response to a data transfer command, the first time interval being less than the second time interval, and the second time interval being less than the third time interval, and the first time interval being associated with the first application category, the second time interval being associated with the second application category, and the third time interval being associated with a third application category.

16. A method for operating a disk drive as defined in claim 12, wherein, in the first operating mode, a disk platter in the disk drive is spinning at an operational rate and, in the second operating mode, the disk platter in the disk drive is not spinning at an operational rate.

17. A method for operating a disk drive as defined in claim 16, wherein, in the second operating mode, the disk platter is stopped.

18. A method for operating a disk drive as defined in claim 16, wherein, in the second operating mode, the disk platter is spinning at a lower rate that is substantially reduced from the operational rate.

19. A method for operating a disk drive as defined in claim 12, wherein the disk drive includes a data structure for the operating mode transition time intervals, and the disk drive is responsive to a command from the mobile device for writing a value for at least one of the operating mode transition time intervals to the data structure.

20. A method for operating a disk drive as defined in claim 19, wherein the disk drive updates the at least one of the operating mode transition time intervals in the data structure based on a usage pattern of previous data transfer commands.

21. A method for operating a disk drive as defined in claim 12, wherein:

transitioning from the second operating mode to the first operating mode consumes a transition quantity of power;

an exchange time interval is a time period during which power consumed by operating in the first power operating mode is about equal to the transition quantity of power; and the first and second operating mode transition time intervals are less than the exchange time interval.

22. A method for operating a disk drive as defined in claim 12, wherein the first application category includes a word processing application and the second application category includes a web browser application.

23. A mobile device, comprising:

a disk drive having a first operating mode that consumes a relatively high level of power and having a second operating mode that consumes a relatively low level of power, the disk drive configured to receive data transfer commands and accompanying application category codes from the mobile device, the disk drive including a microprocessor operable to:

execute the data transfer commands, select a delay time interval based on the application category code accompanying a most recently executed data transfer command, and cause the disk drive to transition from the first operating mode to the second operating mode based on the delay time interval, a file system for generating the data transfer commands based on a request by an application; and a disk drive driver for issuing the data transfer commands and accompanying application category codes to the disk drive.

24. A mobile device as defined in claim 23, wherein the disk drive further includes memory having stored thereon a first transition time interval for transitioning the disk drive from the first operating mode to the second operating mode, and a second transition time interval for transitioning the disk drive from the first operating mode to the second operating mode, wherein the first time interval is less than the second time interval, and the first time interval is associated with a first application category, the second time interval is associated with a second application category.

25. A mobile device as defined in claim 24, wherein the delay time interval is selected from the first transition time interval and the second transition time interval.

26. A disk drive as defined in claim 24, wherein the microprocessor is further operable to predictively update the transition time intervals.

27. A disk drive as defined in claim 26, wherein the microprocessor is operable to predictively update the transition time intervals based on a usage pattern of previous data transfer commands received by the disk drive.

28. A mobile device as defined in claim 23, wherein, in the first operating mode, a disk platter in the disk drive is spinning at an operational rate and, in the second operating mode, the disk platter in the disk drive is not spinning at an operational rate.

29. A mobile device as defined in claim 28, wherein, in the second operating mode, the disk platter is stopped.

30. A mobile device as defined in claim 28, wherein, in the second operating mode, the disk platter is spinning at a lower rate that is substantially reduced from the operational rate.

31. A mobile device as defined in claim 23, wherein:
transitioning from the second operating mode to the first operating mode consumes a transition quantity of power;
an exchange time interval is a time period during which power consumed by operating in the first power operating mode is about equal to the transition quantity of power; and
the delay time interval is less than the exchange time interval.

32. A mobile device as defined in claim 23, wherein the first application category includes a word processing application and the second application category includes an electronic mail reader application.

\* \* \* \* \*